United States Patent
Warrington

(10) Patent No.: US 12,263,614 B2
(45) Date of Patent: Apr. 1, 2025

(54) INSERTION APPARATUS AND METHOD OF PROVIDING THROUGH THICKNESS REINFORCEMENT IN A LAMINATED MATERIAL

(71) Applicant: ROLLS-ROYCE PLC, London (GB)

(72) Inventor: Paul Warrington, London (GB)

(73) Assignee: ROLLS-ROYCE PLC, London (GB)

( * ) Notice: Subject to any disclaimer, the term of this patent is extended or adjusted under 35 U.S.C. 154(b) by 703 days.

(21) Appl. No.: 17/437,689

(22) PCT Filed: Mar. 3, 2020

(86) PCT No.: PCT/EP2020/055592
§ 371 (c)(1),
(2) Date: Sep. 9, 2021

(87) PCT Pub. No.: WO2020/182550
PCT Pub. Date: Sep. 17, 2020

(65) Prior Publication Data
US 2022/0143861 A1    May 12, 2022

(30) Foreign Application Priority Data
Mar. 9, 2019  (GB) ..................... 1903191

(51) Int. Cl.
*B27F 7/13* (2006.01)
*B29C 70/24* (2006.01)
*B29K 307/04* (2006.01)

(52) U.S. Cl.
CPC ............... *B27F 7/13* (2013.01); *B29C 70/24* (2013.01); *B29K 2307/04* (2013.01)

(58) Field of Classification Search
CPC .............................. B27F 7/13; B29K 2307/04
See application file for complete search history.

(56) References Cited

U.S. PATENT DOCUMENTS

| 5,515,798 A | 5/1996 | Aerospatiale |
| 2002/0007897 A1 | 1/2002 | Farley |

FOREIGN PATENT DOCUMENTS

| CN | 110027304 A | 7/2019 | |
| DE | 202011002397 U1 * | 8/2011 | ............ B21F 27/128 |
| EP | 1213383 A2 | 6/2002 | |

OTHER PUBLICATIONS

Aug. 27, 2019—(GB) UK Search Report—App. No. GB1903191.3.
Jul. 17, 2020—(WO) International Search Report and Written Opinion—PCT/EP2020/055592.

* cited by examiner

*Primary Examiner* — Lynda Salvatore
(74) *Attorney, Agent, or Firm* — Banner & Witcoff, Ltd.

(57) ABSTRACT

There is disclosed a method of providing through-thickness reinforcement in a laminated material. A guide foot is moved to a datum location relative the laminated material, at which the guide foot abuts a reinforcement zone on a surface of the laminated material. An insertion operation is conducted by inserting an insertion element through the guide foot into the laminated material along an insertion direction when the guide foot is in the datum location. The insertion element comprises a needle for forming a hole in the laminated material; a reinforcement rod to be received in the laminated material; or a tamping pin for tamping a reinforcement rod received in the laminated material. A corresponding insertion apparatus is disclosed.

11 Claims, 7 Drawing Sheets

INSERTION APPARATUS AND METHOD OF PROVIDING THROUGH THICKNESS REINFORCEMENT IN A LAMINATED MATERIAL

CROSS-REFERENCE TO RELATED APPLICATIONS

This application is a U.S. National Stage Application under 35 U.S.C. § 371 of International Application No. PCT/EP2020/055592, filed Mar. 3, 2020, which claims the benefit of priority to United Kingdom Application No. GB 1903191.3, filed Mar. 9, 2019, and the present application claims the benefit of the filing date of both of these prior applications, which are incorporated by reference herein in their entireties.

FIELD

The disclosure relates to an insertion apparatus for inserting an insertion element into a reinforcement zone of a laminated material, and a corresponding method.

BACKGROUND

It is known to provide materials having desirable combinations of material properties by building the material in multiple layers, to form a laminated material. Examples of laminated materials are composite structures comprising a fibre reinforced matrix layered in a succession of plies, where the matrix may be a resin matrix and the fibres may be carbon fibre, such as plies of carbon fibre reinforced plastic (CFRP). Such materials are anisotropic owing to their laminated construction.

It is known to provide through-thickness reinforcement in such laminated materials by inserting reinforcing rods into holes in the laminated material. Such insertion techniques are often referred to as "Z-pinning", with "Z" referring to the thickness direction of a material having plies extending in orthogonal "X" and "Y" directions. Through-thickness reinforcement may improve the resistance of the laminated material to delamination.

In previously considered methods, a first robotic arm may be provided with an end effector for forming a hole, and a second robotic arm may be provided with an end effector for feeding a reinforcing rod into the hole. With high accuracy control over the movement of the end effectors, reinforcing rod may be aligned with and fed into the respective holes.

BRIEF SUMMARY

According to a first aspect there is provided a method of providing through-thickness reinforcement in a laminated material, the method comprising: moving a guide foot to a datum location relative the laminated material, at which the guide foot abuts a reinforcement zone on a surface of the laminated material; conducting an insertion operation by inserting an insertion element, having a principal axis which is linear, through the guide foot into the laminated material along an insertion direction when the guide foot is in the datum location, wherein the insertion element comprises: a needle for forming a hole in the laminated material; a reinforcement rod to be received in the laminated material; or a tamping pin for tamping a reinforcement rod received in the laminated material.

The method may further comprise moving a carrier for the insertion element relative the guide foot to align the insertion element for insertion through the guide foot when the guide foot is at the datum location, whereby the carrier may be translated relative the guide foot along an axis orthogonal to the insertion direction.

The carrier and the guide foot may be coupled to a common support. Moving the guide foot to the datum location may comprise moving the common support so that the guide foot is at the datum location. Moving the carrier to align the insertion element with the guide foot may comprise moving the carrier relative the common support.

The position of the guide foot along any axis orthogonal to the insertion direction may be fixed with respect to the common support.

The guide foot may be moveable relative the common support along an insertion axis parallel with the insertion direction. The method may further comprise determining displacement of the guide foot along the insertion axis relative the common support when the guide foot is in the datum location relative the laminated material.

The method may further comprise controlling movement of the carrier along the insertion direction for an insertion operation based on the displacement of the guide foot along the insertion axis to compensate for corresponding displacement of the surface of the laminated material. For example, the controller may adjust or determine a start position, and end position or depth along the insertion axis for a hole-forming operation, a rod-insertion operation or a tamping operation based on the displacement of the guide foot along the insertion axis.

The method may further comprise actively controlling a biasing force urging the guide foot against the laminated material based on the displacement of the guide foot.

The method may further comprise moving a plurality of carriers relative the guide foot in sequence to interchange which one of a corresponding plurality of insertion elements is aligned for insertion through the guide foot when the guide foot is at the datum location, whereby each carrier may be translated relative the guide foot along an axis orthogonal to the insertion direction.

The insertion operation may comprise: inserting a needle through the guide foot to form a hole in the laminated material. The insertion operation may comprise inserting a reinforcement rod through the guide foot into the hole. The insertion operation may comprise inserting a tamping pin through the guide foot to tamp the reinforcement rod in the hole.

The insertion operation may comprise simultaneously inserting a plurality of insertion elements of the same type through the guide foot along the insertion direction into respective hole locations in the reinforcement zone by movement of a common carrier for the plurality of insertion elements along the insertion direction.

The guide foot may comprise a plurality of subsets of guide holes. The method may comprise a corresponding plurality of insertion operations whilst the guide foot is at the datum location. In each insertion operation a insertion element may be inserted through a respective subset of the guide holes corresponding to a respective subset of the hole locations in the reinforcement zone.

Each insertion operation may comprise simultaneously inserting a plurality of insertion elements of the same type through the guide foot along the insertion direction into a respective subset of the hole locations in the reinforcement zone by movement of a common carrier for the plurality of insertion elements along the insertion direction. Two subsets of hole locations which receive a insertion element in two separate insertion operations may overlap. For example, a pitch between insertion elements and respective hole locations in an insertion operation may be greater than a minimum pitch between holes locations in the reinforcement zone.

According to a second aspect there is provided a method of providing through-thickness reinforcement in a laminated material, the method comprising: moving a guide foot to a datum location relative the laminated material, at which the guide foot abuts a reinforcement zone on a surface of the laminated material; conducting an insertion operation by inserting an insertion element, having a principal axis which is linear, through the guide foot into the laminated material along an insertion direction when the guide foot is in the datum location, wherein the insertion element comprises: a needle for forming a hole in the laminated material; a reinforcement rod to be received in the laminated material; or a tamping pin for tamping a reinforcement rod received in the laminated material. The method further comprises moving a carrier for the insertion element relative the guide foot to align the insertion element for insertion through the guide foot when the guide foot is at the datum location, whereby the carrier is translated relative the guide foot along an axis orthogonal to the insertion direction.

The carrier and the guide foot may be coupled to a common support. Moving the guide foot to the datum location may comprise moving the common support so that the guide foot is at the datum location. Moving the carrier to align the insertion element with the guide foot may comprise moving the carrier relative the common support.

The position of the guide foot along any axis orthogonal to the insertion direction may be fixed with respect to the common support.

The guide foot may be moveable relative the common support along an insertion axis parallel with the insertion direction. The method may further comprise determining displacement of the guide foot along the insertion axis relative the common support when the guide foot is in the datum location relative the laminated material.

The method may further comprise controlling movement of the carrier along the insertion direction for an insertion operation based on the displacement of the guide foot along the insertion axis to compensate for corresponding displacement of the surface of the laminated material. For example, the controller may adjust or determine a start position, and end position or depth along the insertion axis for a hole-forming operation, a rod-insertion operation or a tamping operation based on the displacement of the guide foot along the insertion axis.

The method may further comprise actively controlling a biasing force urging the guide foot against the laminated material based on the displacement of the guide foot.

The method may further comprise moving a plurality of carriers relative the guide foot in sequence to interchange which one of a corresponding plurality of insertion elements is aligned for insertion through the guide foot when the guide foot is at the datum location, whereby each carrier may be translated relative the guide foot along an axis orthogonal to the insertion direction.

The insertion operation may comprise: inserting a needle through the guide foot to form a hole in the laminated material. The insertion operation may comprise inserting a reinforcement rod through the guide foot into the hole The insertion operation may comprise inserting a tamping pin through the guide foot to tamp the reinforcement rod in the hole.

The insertion operation may comprise simultaneously inserting a plurality of insertion elements of the same type through the guide foot along the insertion direction into respective hole locations in the reinforcement zone by movement of a common carrier for the plurality of insertion elements along the insertion direction.

The guide foot may comprise a plurality of subsets of guide holes. The method may comprise a corresponding plurality of insertion operations whilst the guide foot is at the datum location. In each insertion operation a insertion element may be inserted through a respective subset of the guide holes corresponding to a respective subset of the hole locations in the reinforcement zone.

Each insertion operation may comprise simultaneously inserting a plurality of insertion elements of the same type through the guide foot along the insertion direction into a respective subset of the hole locations in the reinforcement zone by movement of a common carrier for the plurality of insertion elements along the insertion direction. Two subsets of hole locations which receive a insertion element in two separate insertion operations may overlap. For example, a pitch between insertion elements and respective hole locations in an insertion operation may be greater than a minimum pitch between holes locations in the reinforcement zone.

According to a third aspect, there is provided a method of providing through-thickness reinforcement in a laminated material, the method comprising: moving a guide foot to a datum location relative the laminated material, at which the guide foot abuts a reinforcement zone on a surface of the laminated material; conducting an insertion operation by inserting an insertion element, having a principal axis which is linear, through the guide foot into the laminated material along an insertion direction when the guide foot is in the datum location, wherein the insertion element comprises: a needle for forming a hole in the laminated material; a reinforcement rod to be received in the laminated material; or a tamping pin for tamping a reinforcement rod received in the laminated material; wherein the insertion operation comprises simultaneously inserting a plurality of insertion elements of the same type through the guide foot along the insertion direction into respective hole locations in the reinforcement zone by movement of a common carrier for the plurality of insertion elements along the insertion direction.

The insertion operation may comprise: inserting a needle through the guide foot to form a hole in the laminated material. The insertion operation may comprise inserting a reinforcement rod through the guide foot into the hole. The insertion operation may comprise inserting a tamping pin through the guide foot to tamp the reinforcement rod in the hole.

The guide foot may comprise a plurality of subsets of guide holes. The method may comprise a corresponding plurality of insertion operations whilst the guide foot is at the datum location. In each insertion operation a insertion element may be inserted through a respective subset of the guide holes corresponding to a respective subset of the hole locations in the reinforcement zone.

According to a fourth aspect there is provided insertion apparatus for inserting an insertion element into a laminated material, comprising: a support; a guide foot coupled to the support and moveable to a datum location relative a laminated material to abut a reinforcement zone on a surface of the laminated material; wherein the guide foot is configured to guide insertion of an insertion element into the laminated material along an insertion direction; a carrier for an insertion element, wherein the carrier is coupled to the support and moveable relative the support along a translation axis orthogonal to the insertion direction to align the insertion element for insertion through the guide foot into the reinforcement zone along the insertion direction; wherein the carrier is configured to carry one of: a needle for forming a hole in the laminated material; a reinforcement rod to be received in the laminated material; and a tamping pin for tamping a reinforcement rod received in the laminated material.

The insertion apparatus may comprise an actuator (or manipulator) configured to move the support along a translation axis orthogonal to the insertion direction, so as to move the guide foot to the datum location.

The position of the guide foot along any axis orthogonal to the insertion direction may fixed with respect to the support.

The guide foot may be moveable relative the support along an insertion axis parallel with the insertion direction.

The insertion apparatus may comprise a displacement meter configured to determine displacement of the guide foot along the insertion axis relative the common support when the guide foot is at the datum location.

The insertion apparatus may comprise a controller configured to control movement of the carrier along the insertion direction based on the displacement of the guide foot along the insertion axis to compensate for corresponding displacement of the surface of the laminated material.

The insertion apparatus may comprise a biasing member configured to apply a biasing force to bias the guide foot against the laminated material. For example, the biasing member may be a member coupling the guide foot to the support. The insertion apparatus may comprise a controller configured to control the biasing force based on the determined displacement.

There may be a plurality of carriers coupled to the support and configured to carry a respective plurality of insertion elements of different types. Each carrier may be moveable relative the support along a translation axis orthogonal to the insertion direction to align the respective insertion element for insertion through the guide foot into the reinforcement zone. Each carrier may be configured to carry one of: a needle for forming a hole in the laminated material; a reinforcement rod to be received in the laminated material; and a tamping pin for tamping a reinforcement rod received in the laminated material.

The insertion apparatus may comprise a controller configured to control execution of an insertion operation when the guide foot is at the datum location by: moving a carrier for a needle to insert the needle through the guide foot to form a hole in the laminated material; and/or moving a carrier for a reinforcement rod to insert the reinforcement rod through the guide foot into the hole; and/or moving a carrier for a tamping pin to insert the tamping through the guide foot to tamp the reinforcement rod in the hole.

The carrier may be configured to carry a plurality of insertion elements of the same type for simultaneous insertion through the guide foot into respective hole locations in the reinforcement zone.

The guide foot may comprise a plurality of guide holes.

The carrier may be configured to carry a first plurality of insertion elements. The guide foot may comprise a plurality of subsets of guide holes. Each subset may comprise a plurality of guide holes equal to the first plurality, so that a minimum number of insertion operations to insert insertion elements through each of the guide holes of the guide foot using the carrier is two or more.

The carrier may be configured to carry a first plurality of insertion elements at a first pitch. The guide foot may comprise a second plurality of guide holes at a second pitch which is lower than the first pitch.

The insertion apparatus may comprise a controller configured to carry out a method in accordance with the first aspect, the second aspect or the third aspect.

According to a fifth aspect, there is provided a method of making a composite component comprising: laying up a succession of plies of fibre reinforced matrix to form a laminated material; and performing a method in accordance with the first aspect, the second aspect or the third aspect to provide through-thickness reinforcement to the laminated material.

The composite component may be a fan blade. The composite component may be a casing for a gas turbine engine.

The invention may comprise any combination of the features and/or limitations referred to herein, except combinations of such features as are mutually exclusive.

DESCRIPTION OF DRAWINGS

The invention will now be described, by way of example, with reference to the accompanying drawings, in which.

DETAILED DESCRIPTION

Figure 1:
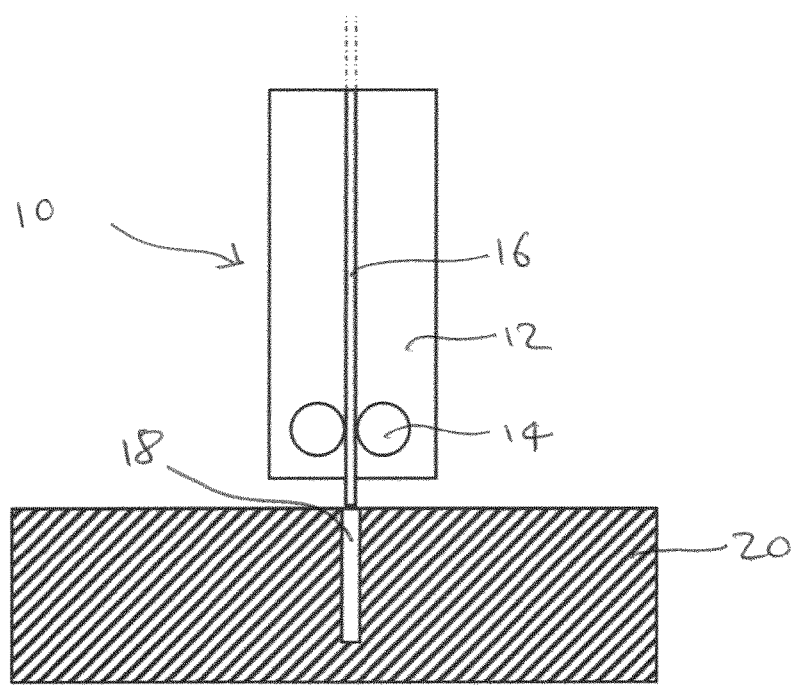
FIG. 1 schematically shows a previously considered rod insertion device for inserting reinforcement rod into a laminated material.

FIG. 1 shows a previously considered example rod insertion device 10 comprising a support 12 and a pair of rollers 14 for feeding reinforcement rod 16 from a rod supply into a hole 18 in a laminated material 20.

The rod insertion device 10 may be mounted as an end effector on a manipulator, such as a robotic arm. In use, the rod insertion device 10 is moved to align with a succession of holes 18 to insert lengths of rod into the respective holes.

Figure 2:
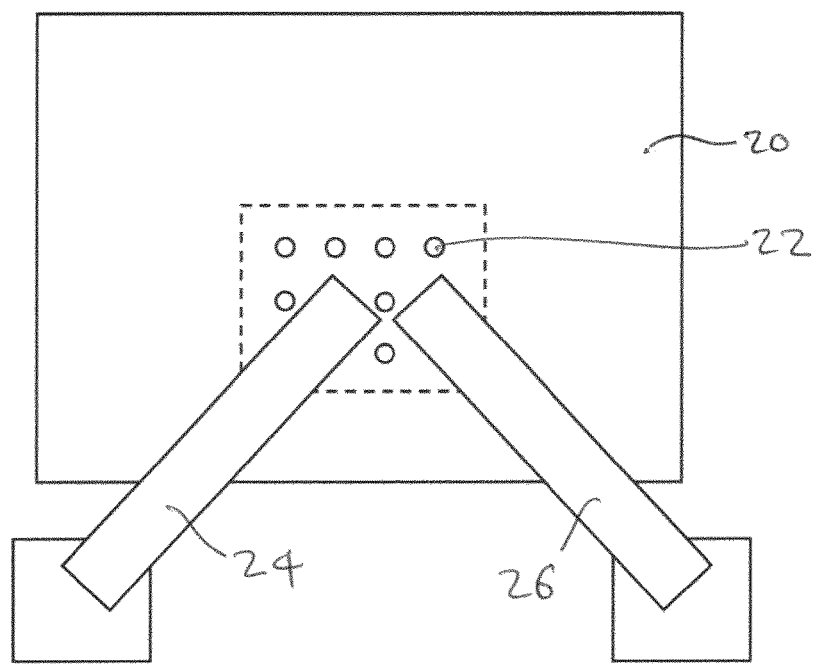
FIG. 2 schematically shows a previously considered apparatus for providing through-thickness reinforcement in a laminated material.

FIG. 2 shows a previously considered apparatus for providing through-thickness reinforcement in a laminated material 20. FIG. 2 shows a top view over an apparatus 20 having a plurality of hole locations 22. Two manipulators 24, 26 are shown. In this example, the first manipulator 24 carries a needle to form the holes at each of the hole locations in sequence, and the manipulator 26 carries the rod insertion device 10 of FIG. 1.

In use, a controller controls movement of each of the manipulators 24, 26 to firstly position the needle at each of the hole locations 22, and subsequently align the hole insertion device with the holes 18 formed at the hole locations. A high degree of accuracy is required for each of the manipulators to place the respective end effectors (i.e. the needle and the rod insertion device) at the same hole location.

Figure 3:
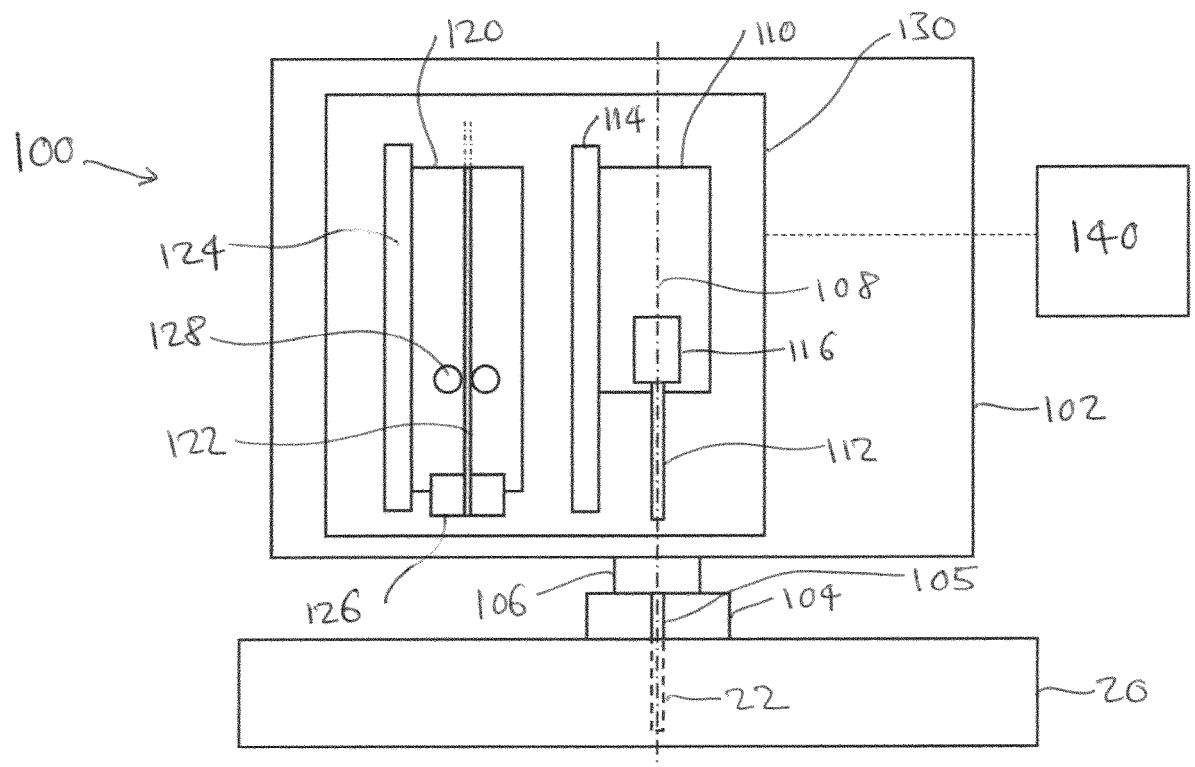
FIG. 3 schematically shows an example insertion apparatus.

FIG. 3 shows an example insertion apparatus 100 and a laminated material 20 including a hole location 22. The insertion apparatus 100 comprises a support 102 which may be provided as an end effector on a robotic arm, gantry system or other manipulator device for movement relative the laminated material 20.

A guide foot 104 is suspended from the support 102 by a suspension member 106 which in this example comprises a pneumatic cylinder configured to permit relative movement between the guide foot 104 and the support 102 along an insertion axis 108 normal to a base of the guide foot. The position of the guide foot 104 relative the support 102 is fixed along axes (i.e. any axis) perpendicular to the insertion axis. As shown in FIG. 3, the base of the guide foot 104 is seated on the laminated material 20. The guide foot 104 comprises a plurality of hole guides 105, although a single hole guide is shown in FIG. 3 for clarity.

The example insertion apparatus 100 comprises a needle carrier 110 and a rod carrier 120 for carrying a needle 112 for forming holes in the laminated material and a reinforcement rod 122 for inserting into such holes respectively. In this example, both carriers 110 are mounted on a common carriage 130 which is moveable relative the support 102 to align either one of the carriers with the guide foot 104 for an insertion operation, as will be described in detail below. In other examples, each carrier may comprise or be provided on a separate carriage.

The common carriage 130 comprises a rail 114 for the needle carrier 110 having an elongate extent parallel with the insertion axis 108. The needle carrier 110 is slidably mounted on the rail 114 for movement along the insertion axis relative the support 102 (and relative the common carriage 130). The needle carrier 110 comprises an actuator unit 116 to which the needle 112 is rotatably mounted.

The common carriage 130 further comprises a rail 124 for the rod carrier 120 having an elongate extend parallel with the insertion axis 108. The rod carrier 120 is slidably mounted on the rail 124 for movement along the insertion axis relative the support 102 (and relative the common carriage 130). The rod carrier 120 comprises a guide head 126 disposed towards the lower end of the rod carrier 120 (as oriented in FIG. 3) and a pair of rollers 128 configured to feed the reinforcement rod along a feed path through the rollers 128 and the guide head 126.

The insertion apparatus 100 is provided with a controller 140 for controlling operation of the insertion apparatus 100, for example movement of the common carriage 130 and operation of the carriers 110, 120. In this example, the controller 140 is provided together with the apparatus (for example, in a computer separate from the physical apparatus but coupled by control wires to the apparatus). In other examples, the controller may be integrated in the apparatus (for example, mounted on the support 102), or may be remote from the apparatus 100 and configured to control it by a wired or wireless link.

Figure 4:
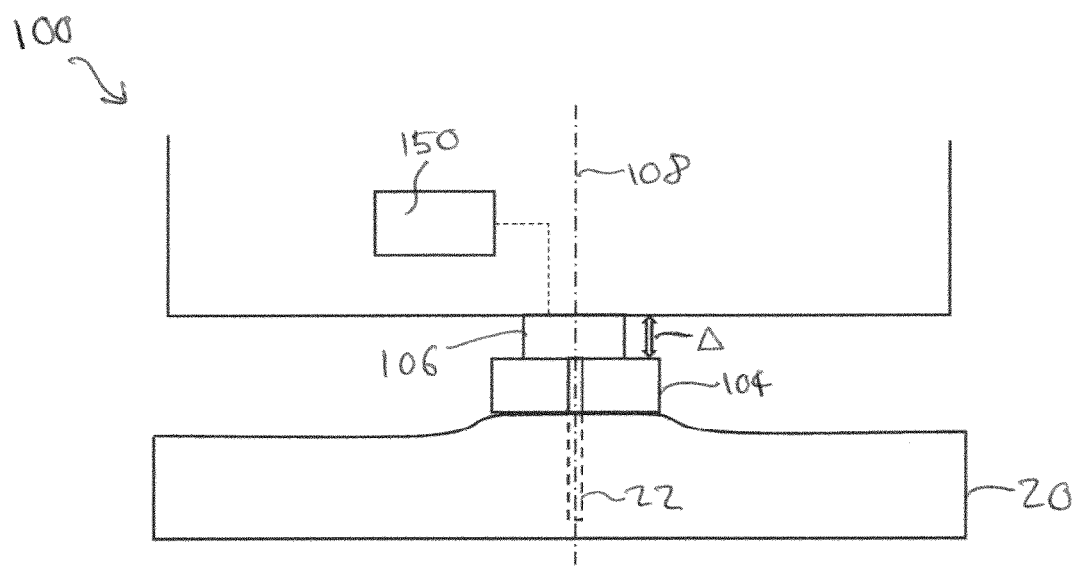
FIG. 4 schematically shows a close-up view of a guide foot of the insertion apparatus illustrating axial displacement owing to material pillowing.

As shown in FIG. 4, the insertion apparatus 100 further comprises a displacement meter 150 coupled to the suspension member 106 to determine displacement A of the guide foot 104 relative the support 102. For example, the displacement meter may be a contact or non-contact sensor (such as a laser displacement sensor).

An example method of providing through-thickness reinforcement in a laminated material will now be described with reference to FIGS. 3-6.

In this example, the insertion apparatus 100 is provided as an end effector on a manipulator (such as a robotic arm). The controller 140 controls the manipulator to move the insertion apparatus 100 relative the laminated material so that the guide foot 104 engages a reinforcement zone on a surface of the laminated material. In this example, the reinforcement zone is a portion of the surface of the laminated material corresponding to a plurality of hole locations including the hole location 22 depicted in FIGS. 3-6. A hole location 22 is merely a virtual reference location for where a hole is to be formed. As will become apparent from the following description, holes will be formed at locations corresponding to the hole guides 105 of the guide foot.

When the guide foot 104 is seated on the reinforcement zone, the controller 140 stops movement of the insertion apparatus 100 (i.e. as an end effector on the manipulator) so that the insertion apparatus 100 is held in fixed registration with respect to the laminated material. The controller 140 may monitor an output of the displacement meter 150 to determine when any movement of the support 102 relative the guide foot 104 settles.

With the insertion apparatus 100 in fixed registration with respect to the laminated material 20, the guide foot can be described as at a datum location relative the laminated material. The term "datum location" is used as the controller 140 can control movement of the carriers 110, 120 for various insertion operations at the hole locations 22 relative the position of the guide foot 104. As the position of the guide foot 104 relative the support 102 is fixed in directions perpendicular to the insertion direction, and monitored by the displacement meter along the insertion direction, the position of the carriers 110, 120 relative the guide foot 104 can be readily determined.

As the guide foot 104 is provided together with the insertion apparatus, a travel of the carriers 110, 120 (i.e. an extent of relative movement) to align with the guide foot is relatively small. Accordingly, high accuracy actuators and control equipment for aligning the carriers 110, 120 with the holes 105 in the guide foot may be relatively inexpensive, for example when compared with actuators and control equipment for relatively large travel manipulators, such as the robotic arms of FIG. 2. In particular, rather than providing high-accuracy large-travel manipulators for the needle and rod carriers 110, 120, only small-travel manipulators (i.e. the carriage 130, in the above example) is provided. Further, the manipulator for the insertion apparatus itself need not be highly accurate to align the guide foot 104 with a reinforcement zone on a laminated material. The locations of the holes in the reinforcement zone are determined by where the guide foot 104 engages the laminated material, and the guide foot 104 need not be precisely aligned with a predetermined virtual hole location.

Figure 5:
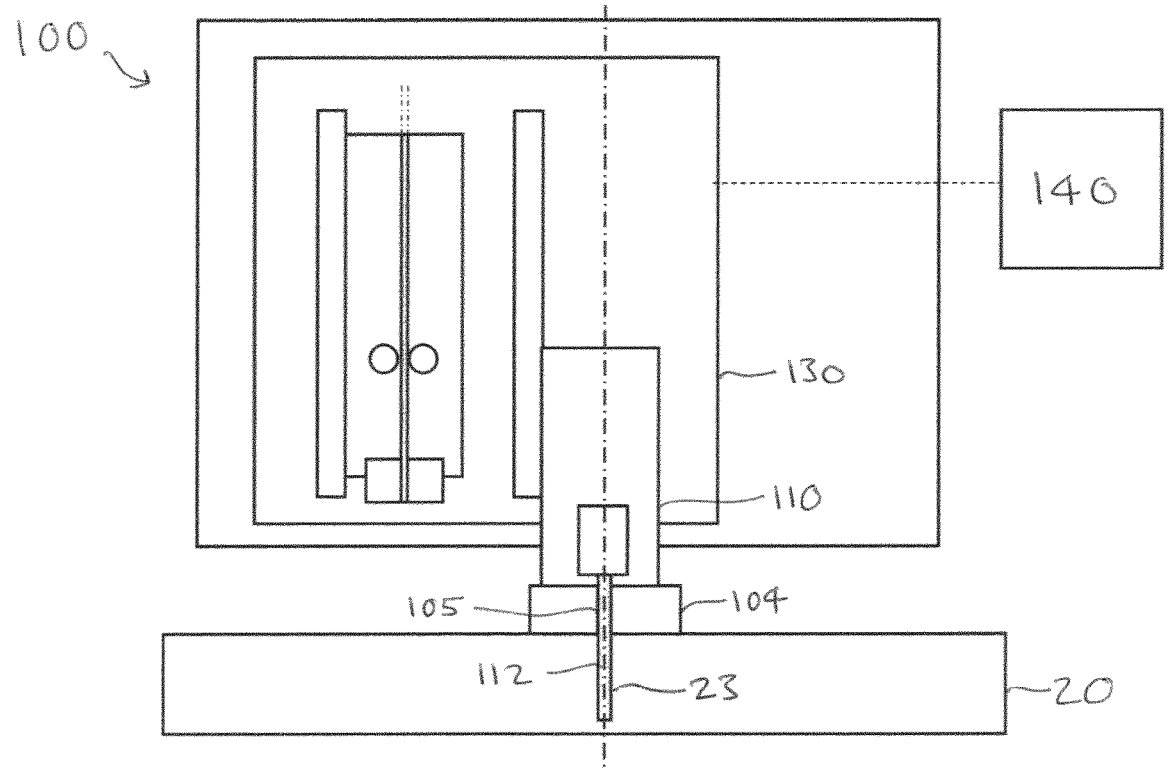
FIGS. 5 and 6 schematically show the insertion apparatus of FIG. 3 in configurations corresponding to two respective insertion operations.

With the guide foot 104 at the datum location, the controller 140 causes the carriage 130 to move laterally (i.e. along axes perpendicular to the insertion axis) to align the needle 112 with a predetermined guide hole 105 in the guide foot 104. The controller 140 executes an insertion operation in which the needle carrier 110 is caused to move along an insertion direction (along the insertion axis) towards the guide foot 104 an the laminated material 20 until the needle 112 is located in the guide hole 105 and at a location corresponding to abutment of the needle 112 with the surface of the laminated material. The insertion operation continues by causing the needle carrier 110 to move along the insertion direction to insert the needle into the laminated material by a predetermined hole depth to form a hole 23, as shown in FIG. 5. The needle carrier 110 is then caused to move along a return direction away from the laminated material.

Figure 6:
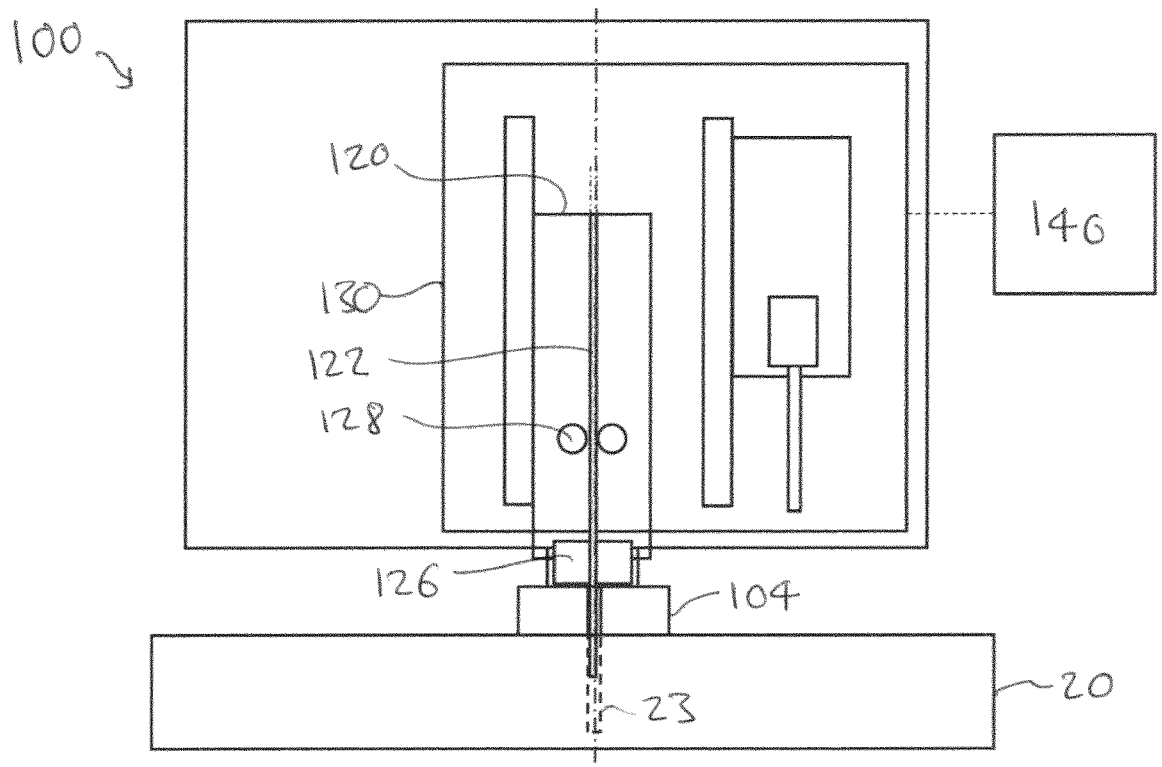

The guide foot 104 remains at the datum location as a similar operation is conducted to insert reinforcing rod into the hole 23. The controller 140 causes the carriage 130 to move laterally to align the rod 122 within the rod carrier 120 with the guide hole 105. The controller 140 executes an insertion operation in which the rod carrier 120 is caused to move along the insertion direction so that the guide head 126 abuts the guide foot 104 so that a guide hole in the guide head 126 aligns with the guide hole 105 of the guide foot 104. The controller 140 causes the rollers 128 to turn to feed the rod 122 through the guide head 126 and the guide foot 104 into the hole 23 by an amount corresponding to the hole depth, as shown in FIG. 6.

The rod may then be cut, for example by a cutter integral with the guide foot 104.

In this example, the hole forming and rod insertion steps described above are repeated for further hole locations corresponding to other hole guides of the guide foot. The guide foot remains at the datum location, and the controller controls the carriage 130 to move the needle carrier 110 and the rod carrier 120 to align with the other hole guides in succession in the manner described above, until each of the hole guides is provided with a reinforcement rod.

In this example, the controller 140 causes the insertion apparatus 100 to move away from the laminated material so that the guide foot 104 is lifted from the laminated material.

The insertion apparatus 100 is repositioned so that the guide foot 104 engages a further reinforcement zone at a further datum location, and the process described above is repeated.

In this example, when the guide foot is lifted from the laminated apparatus, a tamper block is pressed over the holes 23 to tamp the respective lengths of reinforcing rod into the holes.

Figure 7:
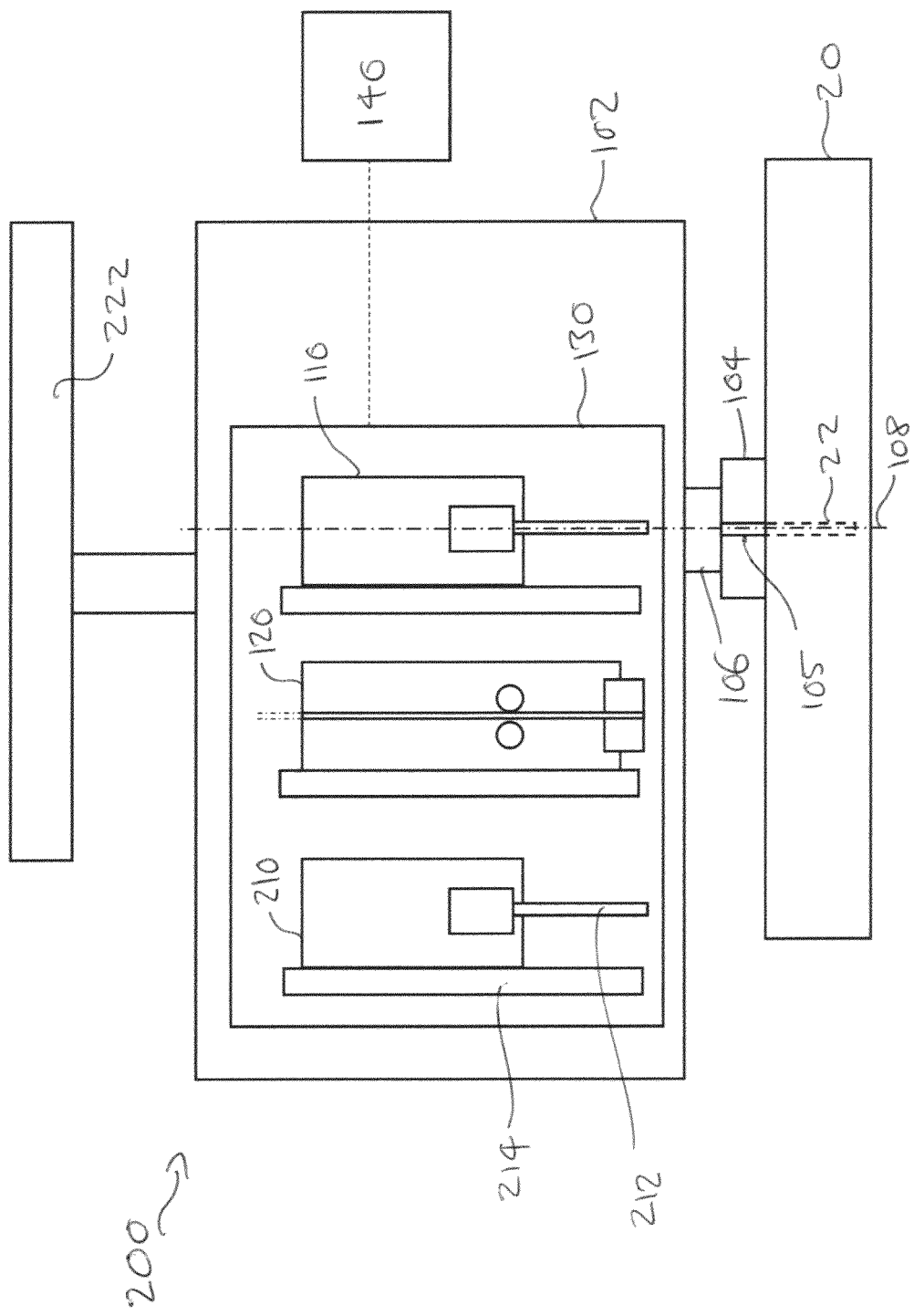
FIG. 7 schematically shows a further example insertion apparatus.

FIG. 7 shows a further example insertion apparatus 200 similar to that described above which differs in that the carriage 130 additionally supports a tamp carrier 210. A tamp pin 212 is mounted on the tamp carrier 210 for insertion through the guide foot 104 to tamp a length of reinforcing rod in a hole in the laminated material.

The common carriage 130 of this example comprises a rail 214 for the tamp carrier having an elongate extent parallel with the insertion axis 108. The tamp 210 is slidably mounted on the rail 213 for movement along the insertion axis relative the support 102 (and relative the common carriage 130).

In use, hole forming and rod insertion steps as described above are followed by the controller 140 causing the common carriage 130 to move laterally to align the tamp pin 212 carrier with a predetermine guide hole 105 of the guide foot 104. An insertion operation is executed in which the tamp carrier 210 moves along the insertion direction so that the tamp pin 212 extends through the guide hole 105 and tamps the reinforcing rod received in the respective hole 23.

The tamp carrier is withdrawn along a return direction opposite the insertion direction.

Hole forming, rod insertion and tamping is then repeated through other guide holes of the guide foot whilst the guide foot 104 remains in the datum location.

The controller 140 controls a manipulator 222, which is a three axis gantry system in this example (as shown in FIG. 7), to lift the insertion apparatus 200 so that the guide foot 104 separates from the laminated material. The manipulator 222 then moves the insertion apparatus 200 so that the guide foot 104 engages the laminated material at a further reinforcement zone for further insertion operations as described above.

Figure 8:
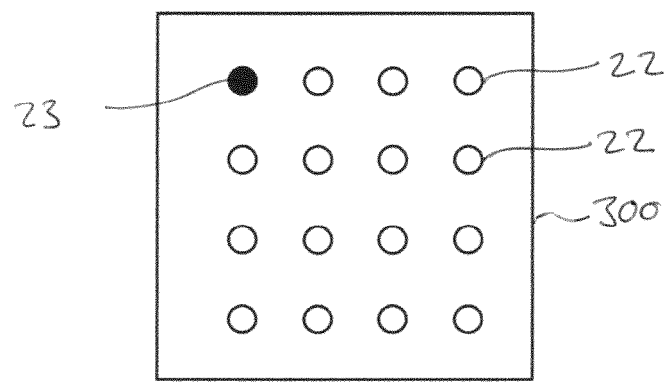
FIGS. 8 and 9 schematically show guide holes of example guide feet.

The above examples have been described for simplicity with respect to needle carriers, rod carriers and tamp carriers comprising one needle, one reinforcement rod (or means for feeding one reinforcement rod) and one tamp pin. FIG. 8 shows an example reinforcement zone 300 of a laminated material showing a regular four by four array of virtual hole locations 22 and a single hole 23 that has been formed, filled with reinforcement rod and tamped using an insertion apparatus comprising one needle, one reinforcement rod and on tamp pin on the respective carriers.

The disclosure extends to insertion apparatus as described above with respect to FIGS. 3-7 but provided with carriers that are each configured to carry multiple insertion elements (needles, reinforcement rods, tamp pins) respectively. For clarity, a single such insertion element is shown in the FIGS. 3-7.

Inserting a plurality of insertion elements at once increases efficiency of manufacture. By using a plurality of tamp pins as opposed to a tamp block configured to act on a plurality of reinforcement rods, the reinforcement rods may be tamped with an equal tamping force. In particular, the tamp pins may comprise a compressible element, such as a spring or compressible material. Accordingly, if a reinforcement rod is stuck, irregularly long or located in a shallow hole (for example), a respective tamp pin may compress when pressed against the reinforcement rod, thereby permitting neighbouring tamp pins to continue pressing against their respective reinforcement rods. In contrast, when using a tamp block, a protruding reinforcement rod may absorb all the force exerted through the tamp block, such that it either breaks or the neighbouring reinforcement rods are inadequately tamped (or not tamped).

Figure 9:
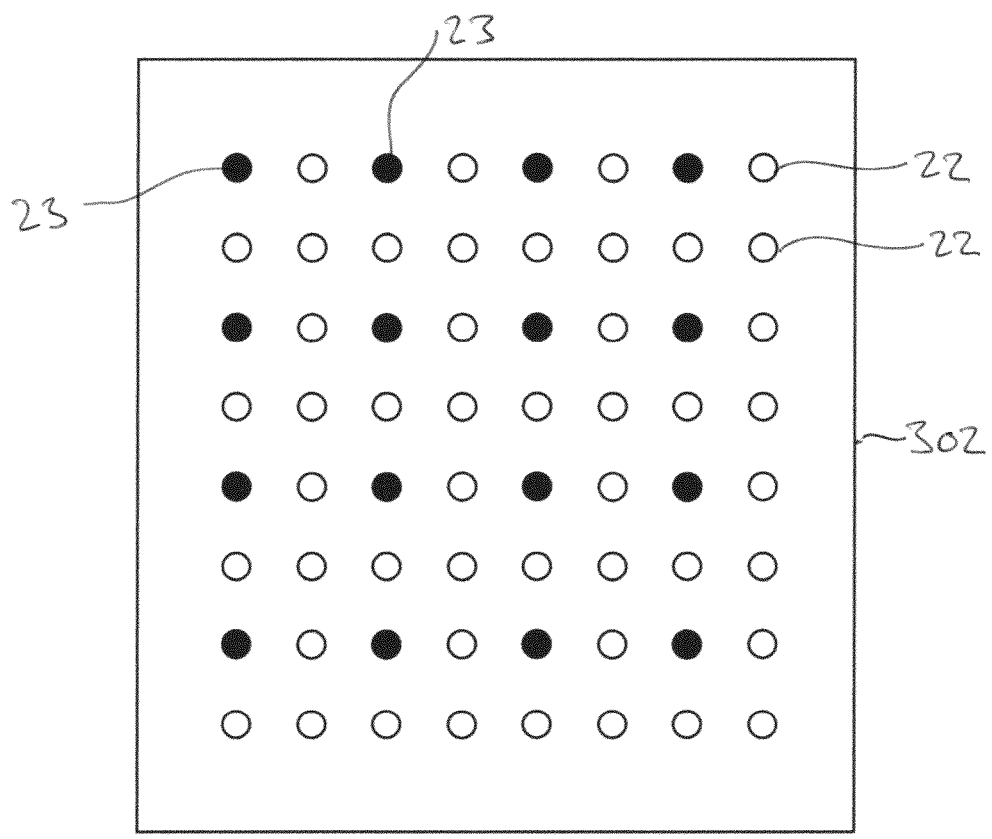

FIG. 9 shows a further example reinforcement zone 302 of a laminated material showing a regular eight by eight array of virtual hole locations 22 of which sixteen are formed, filled and tamped holes 23 by an example insertion apparatus as described above comprising carriers each carrying sixteen multiple insertion elements (needles, reinforcement rods, tamp pins) in a regular four by four array. As shown in FIG. 9, the pitch between the regular four by four array of the carriers (and thereby of the holes 23) is double that of the pitch between the hole locations 22. This may permit simpler manufacture of the carriers as the insertion elements can be spaced relatively far apart. The carriers may be moved by an amount corresponding to the pitch of the hole locations 22 to form, fill and tamp the intervening hole locations shown in FIG. 9.

Figure 10:
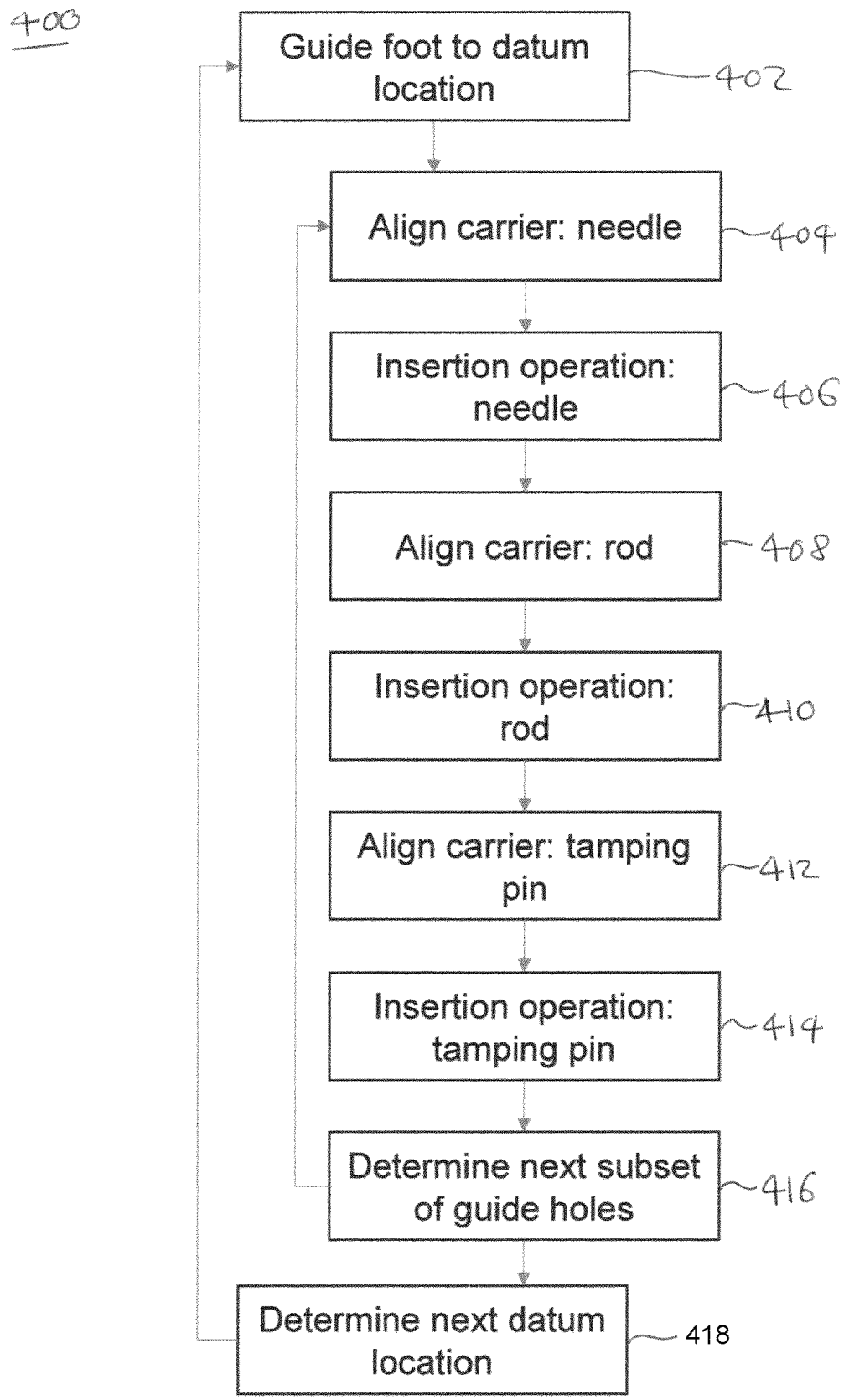
FIG. 10 is a flowchart of an example insertion method.

FIG. 10 is a flowchart of an example method 400 of providing through-thickness reinforcement in a laminated material. In block 402 a guide foot is moved to a datum location relative the laminated material so that the guide foot abuts a reinforcement zone on a surface of the material.

In blocks 404 to 414, a succession of insertion elements are aligned with the guide foot and inserted through the guide foot into the laminated material in respective insertion operations. The insertion elements are aligned with a subset of guide holes of the guide foot. In this example, the subset is one guide hole, but in other examples multiple insertion elements of the same type may be aligned with and inserted through a respective plurality of guide holes within a subset.

In blocks 404 and 406, a needle is moved into alignment with the guide foot and inserted through the guide foot into the laminated material to form a hole in the laminated material.

In blocks 408 and 410, a carrier for a reinforcement rod is moved to align the reinforcement rod with the guide foot, and the reinforcement rod is inserted through the guide foot into the hole formed in the laminated material. The reinforcement rod is subsequently cut to leave a length of reinforcement rod in the hole.

In blocks 412 and 414, a tamp pin is moved into alignment with the guide foot and inserted through the guide foot to tamp the length of reinforcement rod received in the hole.

In block 416, a next subset of guide holes is determined, and the alignment and insertion steps of blocks 404 to 414 are repeated for the respective subset, and further until all subsets of guide holes have been completed.

In block 418, a next datum location for the guide foot is determined, corresponding to a further reinforcement zone on the surface of the laminated material. The method may be repeated from block 402 for the next datum location, until all datum locations are complete.

As described above with respect to the insertion apparatus 100 of FIGS. 3-6, a displacement meter 150 is provided to determine displacement of the guide foot 104 along the insertion axis 108 relative the support 102—i.e. away from the datum location.

Referring back to FIG. 4, such displacement may occur owing to outward deflection of the surface of the laminated material in the reinforcement zone owing to insertion operations, which may be referred to as "pillowing". When such pillowing is detected, it may be compensated for in one of at least two ways. A first way is to apply a compressive force against the reinforcement zone by actively controlling a biasing force exerted by the suspension member 106 on the guide foot 104. A second way is to control insertion operations to compensate, for example by increasing a hole depth, length of reinforcement rod inserted or tamping force, for example. In the example insertion apparatus 100, the controller periodically monitors an output of the displacement meter 150 to determine if pillowing is occurring (i.e. by determining if there is displacement of the guide foot relative the support).

Figure 11:
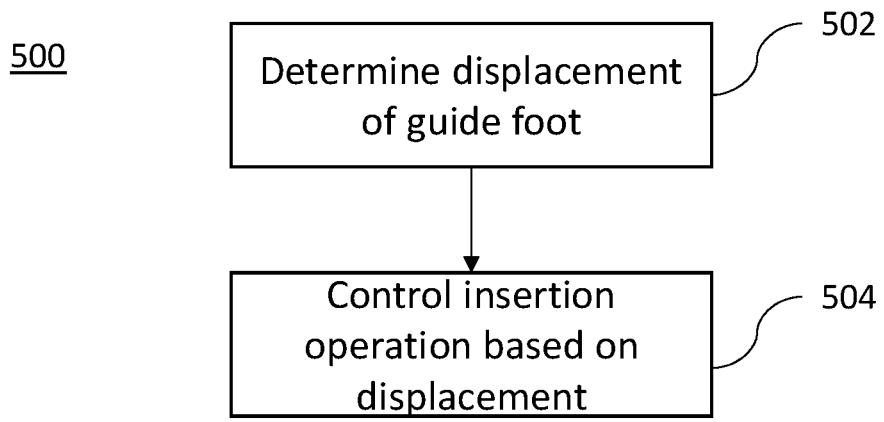
FIG. 11 is a flowchart of a method of compensating for pillowing.

FIG. 11 is a flowchart of a sub method 500 of compensating for pillowing. The sub method may run in parallel and/or continuously with the method described with respect to FIG. 10.

In block 502, displacement of the guide foot relative the support is determined. In block 504, the controller controls movement of the carriers along the insertion direction in subsequent insertion operations based on the displacement of the guide foot to compensate for corresponding displacement of the surface of the laminated material.

Figure 12:
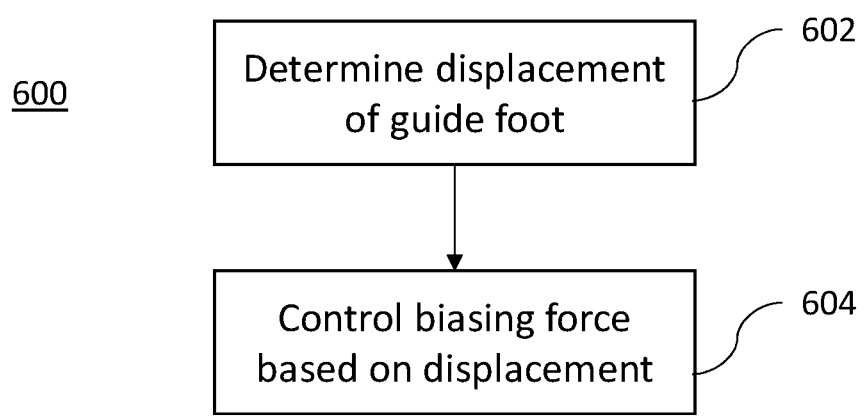
FIG. 12 is a flow chart of a method of compensating for pillowing.

FIG. 12 is a flowchart of a sub method 600 of compensating for pillowing. The sub method may run in parallel and/or continuously with the method described with respect to FIG. 10. The sub method is described with respect to the insertion apparatus 100 of FIGS. 3-6.

In block 602, displacement of the guide foot relative the support is determined. As described above with respect to FIGS. 3 and 4, the suspension member comprises a pneumatic cylinder configured to apply a controllable biasing force urging the guide foot to engage the surface of the laminated material. In block 604 of the flowchart of FIG. 12, the controller actively controls the biasing force through the suspension member based on the determined displacement. For example, the controller may cause the pneumatic pressure to increase to increase the biasing force in response to pillowing of the laminated material. As will be appreciated, the suspension member may comprise any suitable device or arrangement for applying a biasing force, in alternative to a pneumatic cylinder.

An example laminated material is carbon fibre reinforced polymer, layered in a succession of plies. An example reinforcement rod is carbon fibre.

The invention claimed is:

1. A method of processing a laminated material, the method comprising:
moving a guide foot to a datum location relative the laminated material, at which the guide foot abuts a reinforcement zone on a surface of the laminated material;
moving a carrier for an insertion element relative the guide foot to align the insertion element for insertion through the guide foot when the guide foot is at the datum location, whereby the carrier is translated relative the guide foot along a translation axis; and
conducting an insertion operation by inserting the insertion element, having a principal axis which is linear, through the guide foot into the laminated material along an insertion direction when the guide foot is in the datum location, wherein the insertion element comprises:
a needle for forming a hole in the laminated material;
a reinforcement rod to be received in the laminated material; or
a tamping pin for tamping a reinforcement rod received in the laminated material;
wherein the translation axis is orthogonal to the insertion direction.

2. A method according to claim 1, wherein the carrier and the guide foot are coupled to a common support.

3. A method according to claim 2, wherein moving the guide foot to the datum location comprises moving the common support so that the guide foot is at the datum location.

4. A method according to claim 2, wherein the guide foot is moveable relative the common support along an insertion axis parallel with the insertion direction, further comprising determining displacement of the guide foot along the insertion axis relative the common support when the guide foot is in the datum location relative the laminated material.

5. A method according to claim 4, further comprising controlling movement of the carrier along the insertion direction for an insertion operation based on the displacement of the guide foot along the insertion axis to compensate for corresponding displacement of the surface of the laminated material.

6. A method according to claim 4, further comprising actively controlling a biasing force urging the guide foot against the laminated material based on the displacement of the guide foot.

7. A method according to claim 1, further comprising moving a plurality of carriers relative the guide foot in sequence to interchange which one of a corresponding plurality of insertion elements is aligned for insertion through the guide foot when the guide foot is at the datum location, whereby each carrier is translated relative the guide foot along an axis orthogonal to the insertion direction.

8. A method according to claim 1, wherein the insertion operation comprises:
inserting a needle through the guide foot to form a hole in the laminated material;

inserting a reinforcement rod through the guide foot into the hole; and optionally inserting a tamping pin through the guide foot to tamp the reinforcement rod in the hole.

9. A method of processing a laminated material, the method comprising:

moving a guide foot to a datum location relative the laminated material, at which the guide foot abuts a reinforcement zone on a surface of the laminated material;

conducting an insertion operation by inserting an insertion element, having a principal axis which is linear, through the guide foot into the laminated material along an insertion direction when the guide foot is in the datum location, wherein the insertion element comprises:

a needle for forming a hole in the laminated material;

a reinforcement rod to be received in the laminated material; or a tamping pin for tamping a reinforcement rod received in the laminated material;

wherein the insertion operation comprises simultaneously inserting a plurality of insertion elements of the same type through the guide foot along the insertion direction into respective hole locations in the reinforcement zone by movement of a common carrier for the plurality of insertion elements along the insertion direction.

10. A method according to claim 9, wherein the insertion operation for each hole comprises:

inserting a needle through the guide foot to form a hole in the laminated material;

inserting a reinforcement rod through the guide foot into the hole; and optionally inserting a tamping pin through the guide foot to tamp the reinforcement rod in the hole.

11. A method according to claim 9, wherein:

the guide foot comprises a plurality of subsets of guide holes;

wherein the method comprises a corresponding plurality of insertion operations whilst the guide foot is at the datum location; and wherein in each insertion operation an insertion element is inserted through a respective subset of the guide holes corresponding to a respective subset of the hole locations in the reinforcement zone.

\* \* \* \* \*